(No Model.)
J. DOWLING.
POT FOR COOKING PURPOSES.
No. 253,268. Patented Feb. 7, 1882.
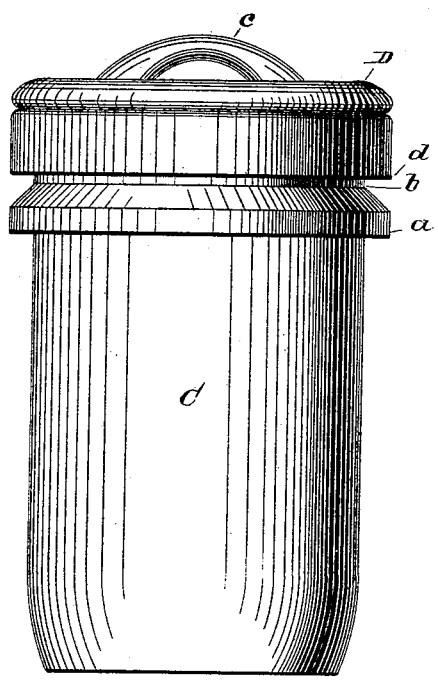
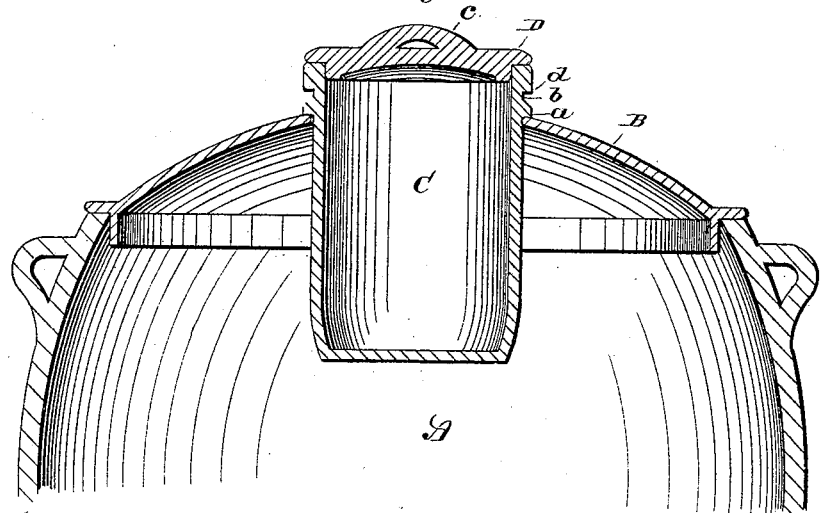

UNITED STATES PATENT OFFICE.

JAMES DOWLING, OF WILKES-BARRÉ, PENNSYLVANIA.

POT FOR COOKING PURPOSES.

SPECIFICATION forming part of Letters Patent No. 253,268, dated February 7, 1882.

Application filed August 25, 1881. (No model.)

*To all whom it may concern:*

Be it known that I, JAMES DOWLING, a citizen of the United States of America, residing at Wilkes-Barré, in the county of Luzerne and State of Pennsylvania, have invented certain new and useful Improvements in Pots for Cooking Purposes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification, in which—

Figure 1 is a side elevation, and Fig. 2 is a vertical transverse section, of the pot and bowl.

My invention relates to a bowl for heating and cooking purposes; and it consists in the construction and arrangement of parts, as will be hereinafter more fully set forth and described.

In the accompanying drawings, forming a part of this specification, the letter A indicates a pot or kettle adapted to be set on a stove and to be filled with water for heating. The kettle A is provided with a removable lid, B, which has an opening in its top center for the reception of a bowl, C. The bowl C is provided near its top with a shoulder, a, having its under side at right angles to the perpendicular wall of the bowl, by which it is supported or suspended within the kettle by resting on the lid. This shoulder a also has an upper surface, beveled upward at an angle of about forty-five degrees, that serves to conduct the ends of the lifter to their place under the shoulder d, and acts as a lower bearing-surface for the ends of the lifter when used for tilting the bowl C to empty its contents. The bowl C is provided with a narrow groove, b, above the shoulder a, immediately above which projecting metal forms a shoulder, d, with a lower side at right angle to the perpendicular wall of the bowl, and its outer side continued to the top of the bowl on a line parallel to the perpendicular line of the bowl. The under side of this shoulder serves as the upper bearing-surface of the lifter. The bowl is provided with a removable lid, D, having a handle, c.

In operating this device I prefer to use a lifter especially constructed for the purpose, for which I have filed an application for Letters Patent. This lifter has four arms dependent from the jaws of the tongs, that terminate in inwardly-projecting beveled ends formed to fit the grooves b. Upon grasping the pot with this lifter it is held so firmly by the ends of the arms bearing against the upper and lower shoulder that it may be inverted to either side without the slightest danger of slipping or loosing the hold.

Having thus described my invention, I claim as new and desire to secure by Letters Patent—

The bowl C, provided with a shoulder, d, having its lower side at right angles to the perpendicular wall of the bowl, and a shoulder, a, having its upper side beveled and its lower side at right angles to the perpendicular wall of the bowl, all arranged and operating to suspend the bowl and form bearing-surfaces for the lifter, substantially as shown and described.

In testimony whereof I affix my signature in presence of two witnesses.

JAMES DOWLING.

Witnesses:
P. J. KENNEY,
C. L. BUCKELEY.